United States Patent
Rossotto

(10) Patent No.: US 10,144,528 B2
(45) Date of Patent: *Dec. 4, 2018

(54) METHOD OF REGULATING A THREE-ENGINED POWER PLANT FOR A ROTARY WING AIRCRAFT

(71) Applicant: AIRBUS HELICOPTERS, Marignane (FR)

(72) Inventor: Regis Rossotto, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/182,663

(22) Filed: Jun. 15, 2016

(65) Prior Publication Data

US 2016/0376017 A1    Dec. 29, 2016

(30) Foreign Application Priority Data

Jun. 23, 2015 (FR) ...................... 15 01299

(51) Int. Cl.
   *B64D 35/08* (2006.01)
   *B64D 31/06* (2006.01)
   (Continued)

(52) U.S. Cl.
   CPC .............. *B64D 31/06* (2013.01); *B64C 27/04* (2013.01); *B64C 27/12* (2013.01); *B64D 35/08* (2013.01);
   (Continued)

(58) Field of Classification Search
   CPC ........ B64D 31/06; B64D 35/08; B64C 27/04; B64C 27/12; F02C 66/02; F02C 66/206;
   (Continued)

(56) References Cited

U.S. PATENT DOCUMENTS 3,930,366 A * 1/1976 Nelson ...................... F02C 9/42
                                                60/39.15
3,963,372 A    6/1976 McLain et al.
(Continued)

FOREIGN PATENT DOCUMENTS

FR    2749545    12/1997
FR    2756256    5/1998
(Continued)

OTHER PUBLICATIONS

French Search Report for French Application No. FR 1501299, Completed by the French Patent Office on Mar. 10, 2016, 10 Pages.

*Primary Examiner* — McDieunel Marc
(74) *Attorney, Agent, or Firm* — Brooks Kushman P.C.

(57) ABSTRACT

A power plant comprising two engine groups and a main power transmission gearbox. Each engine group drives the main gearbox mechanically in order to rotate a main rotor of an aircraft at a frequency of rotation NR. A first engine group comprising two main engines is regulated on a first setpoint NR* for the frequency of rotation NR, while a second engine group comprising a secondary engine is regulated on a second setpoint $W_2^*$ for power of the second engine group. In addition, each engine operates with margins relative to operating limits. The second setpoint $W_2^*$ for power is determined so that each secondary engine operates with a lowest second margin that is equal to the lowest first margin of the first engine group.

16 Claims, 1 Drawing Sheet

(51) Int. Cl.
   *B64C 27/12* (2006.01)
   *F02C 9/42* (2006.01)
   *B64C 27/04* (2006.01)
   *F02C 6/02* (2006.01)
   *F02C 6/20* (2006.01)

(52) U.S. Cl.
   CPC ................. *F02C 6/02* (2013.01); *F02C 6/206* (2013.01); *F02C 9/42* (2013.01); *F05D 2220/329* (2013.01); *F05D 2270/023* (2013.01); *F05D 2270/052* (2013.01); *F05D 2270/13* (2013.01); *Y02T 50/671* (2013.01)

(58) Field of Classification Search
   CPC ................. F02C 9/42; F05D 2220/329; F05D 2270/023; F05D 2270/052; F05D 2270/13
   See application file for complete search history.

(56) References Cited

U.S. PATENT DOCUMENTS

| | | | |
|---|---|---|---|
| 4,475,333 A * | 10/1984 | Tordenmalm | F02D 29/04 60/395 |
| 4,479,619 A | 10/1984 | Saunders et al. | |
| 5,915,273 A | 6/1999 | Germanetti | |
| 6,195,598 B1 | 2/2001 | Bosqui et al. | |
| 9,346,553 B2 | 5/2016 | Gaulmin et al. | |
| 9,353,642 B2 * | 5/2016 | Certain | B64D 35/08 |
| 9,586,691 B2 * | 3/2017 | Rossotto | B64C 27/00 |
| 2011/0121127 A1 * | 5/2011 | Certain | B64D 35/04 244/17.19 |
| 2012/0025032 A1 * | 2/2012 | Hopdjanian | B60L 3/0046 244/53 R |
| 2013/0219905 A1 | 8/2013 | Marconi et al. | |
| 2014/0145028 A1 | 5/2014 | Gomez | |
| 2014/0229036 A1 | 8/2014 | Vallart et al. | |
| 2015/0028135 A1 * | 1/2015 | Lehmann | F02M 63/0026 239/584 |
| 2015/0028153 A1 | 1/2015 | Rossotto et al. | |
| 2015/0176488 A1 * | 6/2015 | Borchers | F02C 6/02 60/773 |
| 2017/0066541 A1 * | 3/2017 | Rossotto | B64C 27/12 |

FOREIGN PATENT DOCUMENTS

| | | |
|---|---|---|
| FR | 2902408 | 12/2007 |
| FR | 2998542 | 5/2014 |
| FR | 2998543 | 5/2014 |
| FR | 3000466 | 7/2014 |
| FR | 3008957 | 1/2015 |
| GB | 2515141 | 12/2014 |
| WO | 2012059671 | 5/2012 |

* cited by examiner

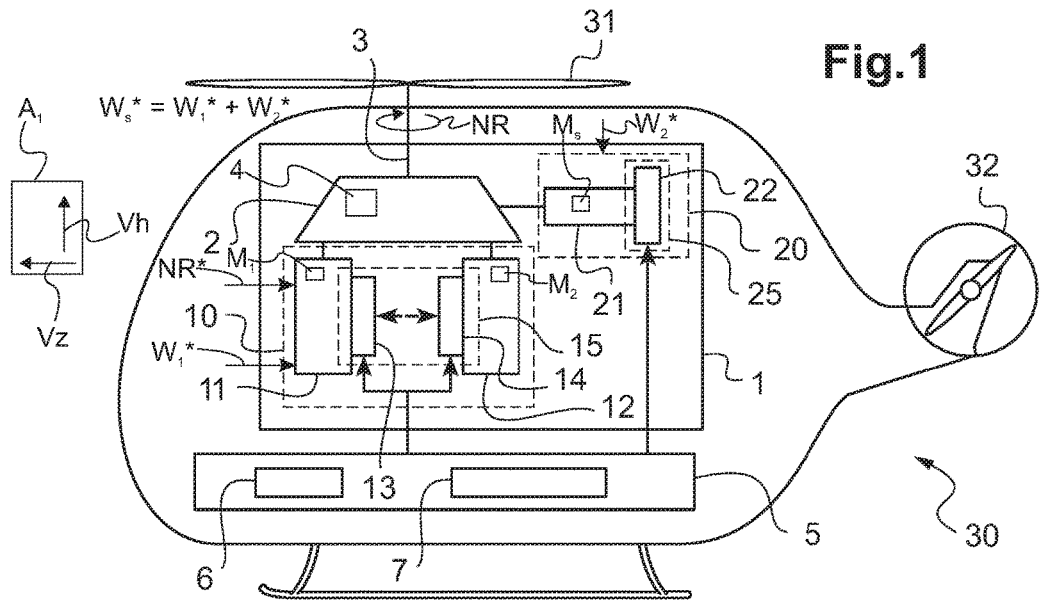
Fig.1
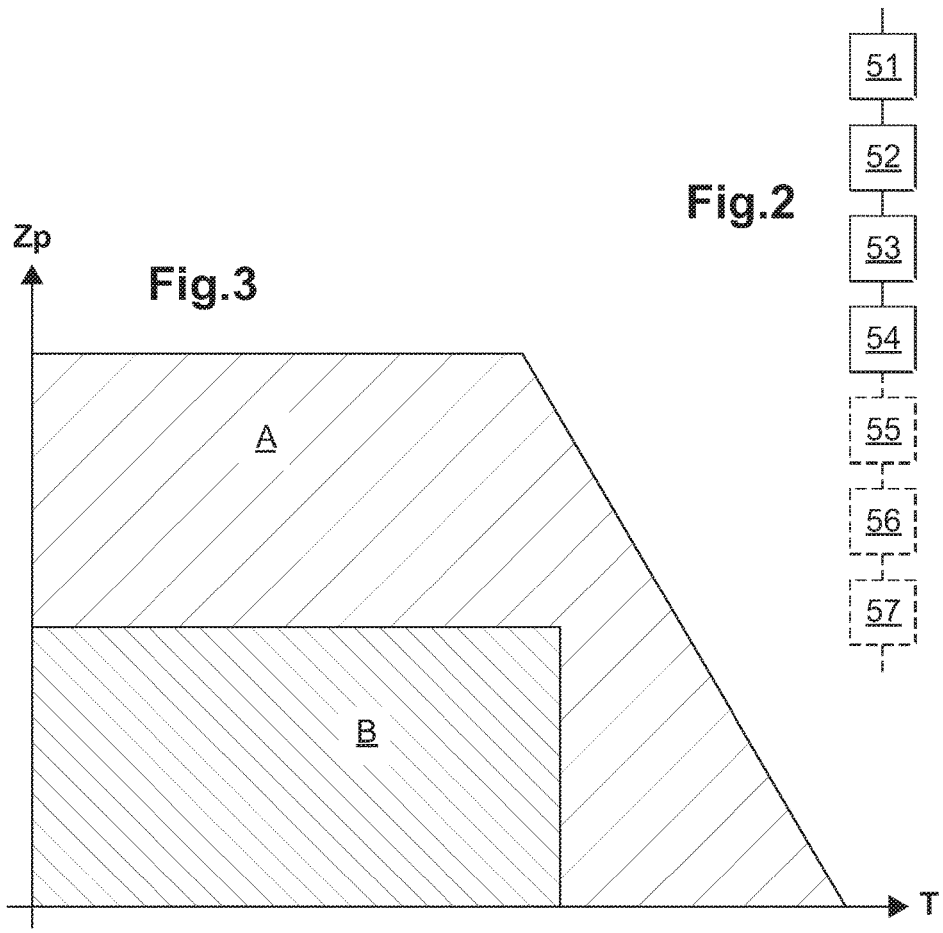
Fig.2
Fig.3

METHOD OF REGULATING A THREE-ENGINED POWER PLANT FOR A ROTARY WING AIRCRAFT

CROSS REFERENCE TO RELATED APPLICATION

This application claims priority to French patent application No. FR 15 01299 filed on Jun. 23, 2015, the disclosure of which is incorporated in its entirety by reference herein.

BACKGROUND OF THE INVENTION (1) Field of the Invention

The present invention lies in the field of powering rotary wing aircraft having a plurality of engines, and more particularly to the field of regulating such a power plant.

The present invention provides a method of regulating a power plant for a rotary wing aircraft and also the power plant and a rotary wing aircraft provided with such a power plant. The invention is particularly intended for regulating a power plant having three engines.

(2) Description of Related Art

A power plant for a rotary wing aircraft generally comprises one or two engines and a main power transmission gearbox. Each engine drives the main gearbox mechanically in order to rotate at least one main outlet shaft of the main gearbox. The main outlet shaft is constrained to rotate with at least one main rotor of the rotary wing aircraft in order to provide the aircraft with lift and possibly also with propulsion.

The main gearbox generally also has secondary outlet shafts, e.g. for driving rotation of a tail rotor or of one or two propulsion propellers via an auxiliary gearbox, and also rotation of an electricity generator and/or hydraulic systems. The respective frequencies of rotation of the secondary outlet shafts are generally different from the frequency of rotation of the main outlet shaft.

It should be observed that the term "engine" is used to mean a driver unit driving said main gearbox mechanically, and consequently contributing to providing the rotary wing aircraft with lift and/or propulsion. By way of example, such engines may be turboshaft engines.

It is now common practice to use two-engined power plants on rotary wing aircraft, each engine being controlled by a dedicated computer. Such engines are generally identical turboshaft engines operating in compliance with regulation rules.

For example, proportional regulation can be used to enable a system to be regulated in proportion to a difference between a current value of the system that is to be regulated and a setpoint value. Such regulation is generally effective. However, proportional regulation never reaches the setpoint value, and there always exists a difference between the current value and the setpoint. Nevertheless, it is possible to approach the setpoint by reducing the difference, but the system then often becomes unstable.

Such proportional regulation, applied to a two-engined power plant of an aircraft enables the two engines of the power plant to be balanced naturally, both in terms of frequency of rotation and of power delivered. Nevertheless, such proportional regulation does not make it possible for the frequency of rotation of the main rotor of the aircraft to be stabilized accurately and effectively.

It is then possible to add a calculation for anticipating the power that the power plant is to deliver in order to improve the effectiveness of such proportional regulation of the frequency of rotation of the main rotor of the aircraft. Such power anticipation calculation is described in particular in Document FR 3 000 466 in the particular context of the main rotor having a frequency of rotation that is variable.

In order to improve proportional regulation, it is possible to introduce an additional correction that enables errors in tracking the setpoint to be eliminated. This correction is proportional to integrating the difference between the current value and the setpoint over time, i.e. it is proportional to the sum of all of the differences as measured continuously. This is then referred to as proportional integral regulation.

There also exists proportional integral derivative regulation that includes an additional correction that is proportional to the derivative of the difference. This correction makes it possible to take account also of variations in the difference, both in direction and in amplitude.

Proportional integral regulation is frequently used on twin-engined aircraft, thus making it possible to control accurately the frequency of rotation of the main rotor and also the performance of the aircraft. Operation is then balanced between the two engines of the power plant, thus making it possible in particular to ensure that wear is symmetrical on these engines and also on the mechanical inlet connections to the main gearbox.

However, such proportional integral regulation requires complex connections between the computers of the two engines in order to ensure that each engine delivers equivalent power. In particular, such proportional integral regulation requires the use of a balancing loop between the two computers.

Furthermore, the computers must be of relatively high performance in order to make such regulation possible. For example, these computers may be of the full authority digital engine control (FADEC) type. These computers are also often two-channel computers, i.e. the connections between the computers and also between the computers and the engines are duplicated in order to make those connections safe, and consequently make safe the operation of the power plant.

Furthermore, the size of rotary wing aircraft is tending to increase, so the need for power from the power plant is also increasing. Consequently, the power plants of such aircraft are being provided with at least three engines in order to be capable of delivering sufficient power.

Three-engined rotary wing aircraft are nowadays mainly fitted with three engines that are identical, thus making it possible in particular to ensure that the power plant responds reactively in the event of the failure of one engine, and also simplifying the installation and the integration of the engine.

Engines are said to be "identical" when they have identical drive characteristics for a rotary member.

Conversely, engines are said to be "unequal" when they have distinct drive characteristics, i.e. engines that generate different maximum powers and/or unequal maximum torque and/or different maximum frequencies of rotation of an outlet shaft. Thus, two unequal engines may correspond respectively to an engine driving an outlet shaft at several tens of thousands of revolutions per minute and to an engine driving an outlet shaft at less than ten thousand revolutions per minute, for example.

For a power plant having three identical engines, the three identical engines are generally regulated identically, with each engine delivering equivalent power.

Nevertheless, the regulation applied to the three identical engines can be different, e.g. two engines may be considered as main engines while the third engine is considered as a secondary engine. The secondary engine then delivers power that is additional to that delivered by the two main engines, depending on the loads on and the needs of the power plant. The power delivered by the secondary engine is then generally different from the power delivered by each of the main engines.

It is also possible to use unequal engines in a three-engined power plant, e.g. for the purpose of satisfying safety requirements or indeed of mitigating the lack of power from engines that are available on the market. For such a three-engined power plant, the regulation of the three engines can turn out to be even more complex, in particular in terms of distributing power among the engines and regulating the frequency of rotation of the main rotor.

In both situations, i.e. whether the engines of the power plant are identical or unequal, the distribution of power between the main engines and each secondary engine of the power plant can be problematic and difficult to optimize.

In particular Documents FR 2 998 542, FR 2 998 543, and FR 3 008 957 are known, which describe a power plant for a rotary wing aircraft having two identical main engines and a secondary engine.

Document FR 2 998 542 describes a secondary engine delivering constant secondary power, the secondary engine being put into operation under certain particular flight conditions such as landing, takeoff, or hovering.

In contrast, Document FR 2 998 543 describes a secondary engine delivering secondary power that is proportional to the main power delivered by each main engine with a coefficient of proportionality that is less than or equal to 0.5.

According to Document FR 3 008 957, the main engines are regulated on a first setpoint for the frequency of rotation of the main rotor of the aircraft, while the secondary engine is regulated on a second setpoint for the power of the secondary engine. Furthermore, the main engines are also regulated on a third setpoint for anticipated power so that the main and secondary engines acting jointly can deliver the power needed at the main rotor for the flight of the aircraft.

The dimensioning of the power plant of an aircraft is thus complex, independently of the selected configuration.

In the technological background, Document U.S. Pat. No. 4,479,619 is known, which proposes a power transmission system for three-engined helicopters. That solution also proposes an alternative to declutching of one of the three engines. The Super-Frelon helicopter of the Applicant also possesses three identical turboshaft engines.

Document U.S. Pat. No. 3,963,372 proposes a solution for managing power and controlling engines in three-engined helicopters.

In order to mitigate the problem of engines that are designed so as to be overdimensioned, a power plant having engines with unequal maximum powers, for two-engined aircraft, have already been envisaged in the past. This applies to Document WO 2012/059671, which proposes two engines having unequal maximum powers.

In addition, document FR 2 902 408 is also known that describes a fuel metering system for balancing power delivered by two turboshaft engines of an aircraft. For this purpose, a difference between the power margins of the two turboshaft engines is determined, then the turboshaft engine having the widest power margin is regulated so as to balance the power of the two turboshaft engines by minimizing said difference.

Finally, document GB 2 515 141 describes a system for synchronizing the performance margin of a power plant for an aircraft that is provided, for example, with two turboshaft engines. Firstly, a difference between the performance margins of the two turboshaft engines is calculated, then the two turboshaft engines are regulated so that said difference reaches a predetermined value.

BRIEF SUMMARY OF THE INVENTION

An object of the present invention is thus to optimize regulation of a power plant in a novel configuration. In particular, the present invention makes it possible to manage the distribution of power among the main engines and each secondary engine of the power plant depending on the loads on the main engines.

The present invention thus provides a method of regulating a power plant having at least three engines for a rotary wing aircraft.

This method of regulating a power plant for an aircraft is for a power plant that has a first engine group, a second engine group, and a main power transmission gearbox, the two engine groups mechanically driving the main gearbox so as to rotate a main outlet shaft of the main gearbox. The main outlet shaft is constrained to rotate with a main rotor of the aircraft, which main rotor has a frequency of rotation NR. A first engine group comprises at least two main engines, and a second engine group comprises at least one secondary engine. Each main engine has a plurality of main operating limits and operates with first margins relative to these main operating limits. Likewise, each secondary engine has a plurality of secondary operating limits and operates with second margins relative to these secondary operating limits.

When the engine is a turboshaft engine having a gas generator and a free turbine, these main or secondary operating limits are, for example: the frequency of rotation NG of the gas generator, the temperature T4 of the gas leaving said generator, and the torque of the free turbine.

In addition, each main engine and each secondary engine possesses a maximum power that is different depending on the stage of flight and on the operating conditions of the engines.

By way of example, a maximum continuous power (MCP) is available continuously during the flight of the aircraft and a maximum takeoff power (TOP) of greater value is available for a limited length of time during a stage of the aircraft taking off.

Furthermore, in order to compensate for a failure of an engine, each engine that remains in operation is caused to operate in a special mode known as one engine inoperative (OEI). This special mode enables each engine to develop emergency mechanical powers that are greater than the maximum continuous mechanical power MCP, but with constraints on operating time.

This method of regulating a power plant of the invention comprises the following plurality of steps:

determining a first setpoint NR* for the frequency of rotation NR of the main rotor;

regulating the operation of each main engine on the first setpoint NR* for the frequency of rotation NR of the main rotor of the aircraft;

determining a second setpoint $W_2^*$ for the power to be delivered by the second engine group, so that each secondary engine operates with the lowest second margin that is equal to the lowest first margin from among the first margins of the main engines of the first engine group; and regulating the operation of each secondary engine on the second setpoint $W_2^*$ for power.

In the context of rotary wing aircraft, the first setpoint NR* for the frequency of rotation NR of the main rotor of the aircraft is traditionally a constant value. Consequently, this constant first setpoint NR* is determined while the aircraft is under development, after study and testing so as to take numerous criteria into account, such as on-board weight, travel speed of the aircraft, aerodynamics, or indeed type of mission.

Nevertheless, this first setpoint NR* for the frequency of rotation NR of the main rotor of the aircraft may also be variable, generally over a predetermined range, e.g. of the order of 15% to 20% of a nominal frequency of rotation for the main rotor. This variation in the first setpoint NR* makes it possible, for example, to reduce the noise from the aircraft or indeed to improve its aerodynamic performance, in particular at high forward speeds.

This variable first setpoint NR* is then determined continuously during the flight of the aircraft. This variable first setpoint NR* may be determined by a computer on board the aircraft, such as an automatic flight control system "(AFCS)". In particular, the variable first setpoint NR* may be determined as a function, among others, of actions on flight controls, of flight characteristics of the aircraft, and of the stage of flight of the aircraft.

The operation of the first engine group is then regulated so as to control the frequency of rotation NR of the main rotor of the aircraft. This frequency of rotation NR is then substantially equal to the first setpoint NR*, but may nevertheless vary a little around this first setpoint NR* when regulation is taking place in dynamic stages.

By way of example, the operation of each main engine of the first engine group is regulated using a proportional integral regulation loop, possibly via a first regulator device. The first regulator device serves to regulate the frequency of rotation of the free turbine of each main engine, each main engine preferably being a turboshaft engine managed by a FADEC type main computer. The free turbine of each main engine drives the main gearbox and enables at least the main outlet shaft to be rotated, and consequently enables the main rotor of the rotary wing aircraft to be rotated at the frequency of rotation NR.

Thereafter, a second setpoint $W_2^*$ is determined for the power to be delivered by the second engine group, so that each second engine operates with the lowest second margin that is equal to the lowest first margin from among the first margins of the main engines of the first engine group; and Said lowest margin from among the margins relative to the operating limits of an engine is often referred to by the expression "first limit" in the field of aviation, and in the field of rotary wing aircraft in particular. Said lowest margin is used in particular in a "first limit indicator" (FLI) described for example in documents FR 2 749 545 and FR 2 756 256.

In addition, it should be observed that when the main engines are identical and are regulated, for example, using a proportional regulation loop or a proportional integral regulation loop, these main engines operate in balanced manner while they are operating correctly, i.e. without damage to at least one of said main engines. Specifically, the first margins relative to their respective main limits are substantially equal or very close.

Finally, the operation of the second engine group is regulated to deliver a second power $W_2$. Consequently, this second power $W_2$ is substantially equal to the second setpoint $W_2^*$, but may nevertheless vary a little around this second setpoint $W_2^*$ when regulation is taking place during dynamic stages.

By way of example, the operation of each secondary engine of the second engine group is regulated using a proportional regulation loop or indeed a proportional integral regulation loop, possibly by means of a second regulator device. The power delivered by each secondary engine is thus adjusted without increasing the work load on the pilot compared with piloting a two-engined aircraft, from the point of view of the piloting necessary for maintaining the performance of the aircraft. This second regulator device serves to control the torque from each secondary engine so that the second engine group delivers the second power $W_2$, even though the speed of rotation of each secondary engine is imposed by each main engine being regulated on the first setpoint NR*.

Furthermore, the second regulator device includes as many secondary computers as there are secondary engines, each secondary computer being connected to a single secondary engine, the secondary computers being connected to one another in order to enable the secondary engines to be regulated. By way of example, each computer is of the FADEC type.

The second regulation device may also regulate the second engine group by means of a first limit indicator FLI. The second setpoint $W_2^*$ for power may thus be determined on the basis of information provided by said first limit indicator FLI of the primary engines.

Thus, each secondary engine is used proportionally to the load of the main engines, the lowest second margin being equal to the lowest first margin of the main engines.

Specifically, while the main engines are operating with a considerable first margin, they are far from their main limits. They therefore operate with a considerable power reserve. Each secondary engine also operates with a considerable second margin and is therefore lightly loaded.

However, when the main engines are operating with a low first margin, they are close to their main limits. They are thus operating with a low power reserve and may thus need extra power. Each secondary engine also operates with a second low margin and is thus heavily loaded in order to provide this extra power. The presence of each secondary engine thus makes it possible to reduce the load on the main engines, which, without the presence of each secondary engine, would operate even closer to their main limits.

Advantageously, the main engines and each secondary engine thus operate in analogous manner. In particular, the variations in power of the main engines and those of each secondary engine are substantially equal. In addition, the operating transitions of the main and secondary engines take place in linear manner with controlled acceleration rates, e.g. in order to avoid jolts in yaw of the aircraft and oscillations in the parameters of these engines. Finally, the main engines and each secondary engine reach their respective operating limits at the same time.

Furthermore, when the first and second margins are considerable, each secondary engine is lightly loaded and each main engine has a considerable power reserve. Consequently, failure of at least one secondary engine advantageously goes unnoticed for a pilot of the aircraft and is therefore transparent relative to the flight of the aircraft, this failure having no effect on the frequency of rotation NR of the main rotor.

In addition, in the event of a failure of a main engine, each main engine that has not failed and each operating secondary engine with respective considerable first and second margins have a power reserve that makes it possible advantageously to compensate for said failure of a main engine.

In addition, the main and secondary engines operating with respective substantially equal lowest first and second margins, is compatible with the use of a first limit indicator FLI for monitoring said main and secondary engines.

Finally, since the first margin and the second margin are substantially equal, wear of each main or secondary engine during operation is also substantially equivalent. All of the engines of the power plant are thus degraded substantially at the same rate. These engines therefore experience aging that is substantially equivalent during their lifetime and, in particular, if the main engines are identical, they thus provide maximum powers that are substantially equal during their lifetime. Advantageously, this also makes it possible to perform maintenance on said engines simultaneously, thus making it possible to optimize the time and the cost of maintenance for each engine group.

Preferably, the first engine group comprises two identical main engines, while the second engine group comprises a single secondary engine that is different from the main engine. The secondary engine may for example be lighter in weight and smaller in size than the main engines and may deliver maximum power that is less than that of the main engines.

Furthermore, the first engine group and the second engine group deliver output power Ws jointly. This output power Ws is equal to the sum of the second power $W_2$ delivered by the second engine group plus a first power $W_1$ delivered by the first engine group, such that:

$$Ws = W_1 + W_2$$

In the method of regulating a power plant, a flight anticipation power Ws* is determined that corresponds to the power that is necessary for the flight of the aircraft and that would need to be delivered jointly by the first and second engine groups.

Thereafter, a third setpoint $W_1^*$ is determined for the power to be delivered by the first engine group, such that:

$$Ws^* = W_1^* + W_2^*$$

Finally, this third setpoint $W_1^*$ for power can be used so that the first engine group and the second engine group anticipate the aircraft's need for power and act jointly to deliver the flight anticipation power Ws*.

The flight anticipation power Ws* may be determined by anticipation means taking account by anticipation of torque and/or power requirements at the main rotor of the aircraft.

This flight anticipation power Ws* may also be determined depending on the performance needs of the aircraft, in particular on the basis of information about the flight status and the flight situations of the aircraft and also as a function of flight controls operated by a pilot of the aircraft. For example, the anticipation means take account of the first setpoint NR* and also of the acceleration or the deceleration of the main rotor.

The anticipation means may be incorporated in calculation means present in the aircraft or indeed directly in the avionics installation of the aircraft.

In addition, in the particular situation of a given stage of flight of the aircraft and since the frequency of rotation NR of the main rotor is regulated by the first engine group, the flight anticipation power Ws* may be constant. The second regulator device then serves to adjust the distribution of this necessary flight anticipation power Ws* between each of the engine groups.

The second engine group is thus controlled solely in power, depending on the second setpoint $W_2^*$, while the first engine group is regulated so as to give priority to controlling the frequency of rotation NR of the main rotor of the aircraft. The power delivered by each engine group can thus advantageously be optimized without degrading the performance of the power plant, and in particular while complying with the first setpoint NR*. The distribution of flight anticipation power Ws* between the two engine groups, i.e. between the second and third setpoints $W_2^*$ and $W_1^*$ for power, can then be performed by the calculation means depending on various operating criteria of the power plant.

In a first implementation of the invention, the second setpoint $W_2^*$ is determined depending on the main operating limits of the main engines of the first engine group for the entire flight envelope of the aircraft, so that each secondary engine operates with the lowest second margin that is equal to the lowest first margin of the first engine group.

However, in order to optimize flight performance of the aircraft, or indeed its security, in particular with regard to operating limits of the aircraft, it may be advantageous to adapt the determination of said second setpoint $W_2^*$ to the operating conditions of the aircraft or to the stage of flight of the aircraft.

In a second implementation of the invention, the second setpoint $W_2^*$ is determined depending on the most critical operating limit of the power plant from among the main operating limits of the main engines of the first engine group and tertiary operating limits of the main gearbox.

The main gearbox also has a plurality of tertiary operating limits having a limit torque that it can transmit to the main rotor and a limit operating temperature. This limit torque and/or this limit operating temperature for the main gearbox thus make(s) it possible to determine, as a function of the current operating conditions, a limit power that can be delivered by the main gearbox.

Thus, when the most critical operating limit of the power plant is a main operating limit of the main engines of the first engine group, the second setpoint $W_2^*$ is determined so that each secondary engine operates with the lowest second margin that is equal to the lowest first margin of the first engine group as described above.

However, when the most critical operating limit of the power plant is a tertiary limit of the main gearbox, the second setpoint $W_2^*$ is determined so that said second setpoint $W_2^*$ is equal to the limit power of the main gearbox minus the sum of the maximum powers of each main engine.

The flight envelope in which the most critical operating limit of the power plant is a tertiary limit of the main gearbox is generally located for atmospheric pressure and air temperatures outside the aircraft that are moderate, when the atmospheric pressure and the temperature of the outside air are associated with the flying altitude of the aircraft.

In this event, the output power Ws is constituted mainly, or even solely, by the sum of the first powers $W_1$ of the main engines.

Under these pressure and temperature conditions, the sum of the maximum powers of each main engine is generally strictly greater than the limit power of the main gearbox. The second setpoint $W_2^*$ determined so as to be equal to the limit power of the main gearbox minus the sum of the maximum powers of each main engine is therefore a negative value. The second setpoint $W_2^*$ used to regulate the operation of the second engine group is thus zero.

Thus, failure of at least one secondary engine advantageously goes unnoticed for a pilot of the aircraft and is therefore transparent relative to the flight of the aircraft. However, even though the second setpoint $W_2^*$ is zero, each secondary engine is nevertheless still running, and operating at a low speed in order to be capable of being activated quickly in the event of a failure of a main engine.

Furthermore, the maximum powers of each main engine are different depending on the stage of flight of the aircraft and/or on flight conditions, in particular the pressure and the temperature of the air outside the aircraft.

It is then possible to use a selection algorithm for determining the stage of flight of the aircraft automatically, for example, using the values for the horizontal speed Vh and the vertical speed Vz of the aircraft. The maximum power of each engine may then be determined.

Advantageously, this second implementation enables each secondary engine to be used and loaded only when necessary. When the most critical operating limit of the power plant is a tertiary limit, the main engines are generally operating far from their main limits. Consequently, these main engines have a considerable power reserve and therefore do not need extra power.

However, when the most critical operating limit of the power plant is a main limit, the main engines are then operating closer to their main limits. Under such circumstances, the power reserve of these main engines is small and the extra power that each secondary engine is capable of providing is useful for reducing the load on said main engines.

In the event of failure of at least one main engine, it is possible to regulate the operation of each secondary engine on the second setpoint $W_2^*$ for power in a manner that is identical to the first implementation. Thus, each secondary engine operates with the lowest second margin that is equal to the lowest first margin of the first engine group.

During failure of at least one main engine, it is also possible to regulate the operation of each secondary engine on the second setpoint $W_2^*$ for power in a manner that is identical to the second implementation as a function of the most critical operating limit of the power plant.

Nevertheless, in the event of a failure of at least one main engine, each secondary engine may also be regulated differently in order to distribute the power of the power plant differently between each main engine that has not failed and each secondary engine.

For example, it is possible to use each secondary engine delivering its available maximum power. Thus, the second engine group delivers a maximum second power $W_2$ in order to limit the first power $W_1$ delivered by the first engine group. This makes it possible to reduce or even to avoid the use of OEI modes of operation for each main engine.

It is also possible to regulate the operation of each secondary engine on the first setpoint NR* for the frequency of rotation NR of the main rotor, so as to guarantee that this first setpoint NR* is complied with. This regulation may be performed in proportional mode or in proportional integral mode.

The present invention also provides a power plant for an aircraft and comprising first and second engine groups, and a main power transmission gearbox. The two engine groups drive the main gearbox mechanically in order to rotate at least one main outlet shaft of the main gearbox. The main outlet shaft is constrained to rotate with a main rotor of the aircraft at a frequency of rotation NR.

A first engine group comprises at least two main engines and a first regulator device. The first regulator device is configured to regulate the operation of each main engine on a first setpoint NR* for the frequency of rotation NR of the main rotor of the aircraft.

A second engine group has at least one secondary engine and a second regulator device. The second regulator device is configured to regulate the power delivered by each secondary engine on a second setpoint $W_2^*$ for the power to be delivered by the second engine group.

Each main engine has a plurality of main operating limits and operates with first margins relative to said main operating limits. In addition, each secondary engine has a plurality of secondary operating limits and operates with second margins relative to these secondary operating limits. The main gearbox also has a plurality of tertiary operating limits such as a limit torque and a limit operating temperature.

Calculation means are configured to determine the second setpoint $W_2^*$ in accordance with the implementations of the above-described method of regulating a power plant. These calculation means may be situated in the power plant or in the aircraft.

The power plant may also include anticipation means configured to determine the flight anticipation power Ws* necessary for the flight of the aircraft and that needs to be delivered jointly by the first and second engine groups. The third setpoint $W_1^*$ for the power to be delivered by the first engine group is thus determined so that:

$$Ws^* = W_1^* + W_2^*$$

Finally, this third setpoint $W_1^*$ for power can then be used so that the first engine group and the second engine group anticipate the power need of the aircraft and act jointly to deliver the flight anticipation power Ws*.

The first engine group preferably has two identical main engines and the second engine group has a single secondary engine different from the main engines.

In the event of a failure of at least one main engine, the second regulator device enables the operation of each secondary engine to be regulated on the first setpoint NR* for the frequency of rotation NR of the main rotor in proportional mode or indeed in proportional integral mode. The second regulator device may also regulate the operation of each secondary engine on the second setpoint $W_2^*$ for power as determined above or indeed by delivering the maximum power available from each secondary engine.

The present invention also provides a rotary wing aircraft having at least one main rotor, a power plant as described above, and an avionics installation, the power plant driving the main rotor in rotation. The calculation means, and the second regulator device of the power plant may be situated in the avionics installation of the aircraft.

BRIEF DESCRIPTION OF THE SEVERAL VIEWS OF THE DRAWINGS

The invention and its advantages appear in greater detail from the context of the following description of implementations given by way of illustration and described with reference to the accompanying figures, in which:

FIG. 1 shows a rotary wing aircraft fitted with a device of the invention for regulating a power plant;

FIG. 2 is a block diagram summarizing the method of the invention for regulating a power plant; and FIG. 3 is a plot representing the operating limit zones of the power plant of the invention.

Elements present in more than one of the figures are given the same references in each of them.

DETAILED DESCRIPTION OF THE INVENTION

FIG. 1 shows a rotary wing aircraft 30 having a main rotor 31, a tail rotor 32, a power plant 1, and an avionics installation 5. The power plant 1 has a first engine group 10, a second engine group 20, and a main power transmission gearbox 2. The two engine groups 10 and 20 drive the main gearbox 2 mechanically in order to drive rotation of a main outlet shaft 3 of the main gearbox 2. The main outlet shaft 3 is constrained to rotate with the main rotor 31, which rotates at a frequency of rotation NR in order to provide the aircraft 30 with lift and possibly also propulsion.

The tail rotor 32 may also be driven in rotation by the main gearbox 2 via a secondary outlet shaft from the main gearbox 2.

The first engine group 10 comprises two identical main engines 11 and 12 and a first regulator device 15. The first regulator device 15 has two main computers 13 and 14, each main computer 13, 14 being connected to a single main engine 11, 12. The main computers 13 and 14 are also connected to each other.

The second engine group 20 comprises a secondary engine 21 and a second regulator device 25. The second regulator device 25 comprises a secondary computer 22 connected to the secondary engine 21. The secondary engine 21 is different from the main engines 11 and 12. The secondary engine 21 is lighter in weight and of smaller dimensions than the main engines 11 and 12, and it delivers a maximum power that is less than that of the main engines 11, 12.

The main engines 11 and 12 and the secondary engine 21 are turboshaft engines, each comprising a gas generator and a free turbine driving the main gearbox 2.

The main engines 11 and 12 and the secondary engine 21 can deliver maximum powers $M_1$, $M_2$, and $M_s$ respectively that differ depending on the stage of flight and the operating conditions of the engines, in particular a maximum continuous power MCP, a maximum takeoff power TOP, and OEI contingency mechanical powers. It is then possible to use a selection algorithm $A_1$ for determining the stage of flight of the aircraft automatically, for example, using the values for the horizontal speed Vh and the vertical speed Vz of the aircraft.

In addition, each main engine 11, 12 operates with first margins relative to main operating limits and the secondary engine 21 operates with second margins relative to secondary operating limits. These main or secondary operating limits are, for example, the frequency of rotation NG of the gas generator, the temperature T4 of the gas leaving said generator, and the torque of the free turbine.

The main gearbox 2 also has a plurality of its own tertiary operating limits 4 such as a limit torque and a limit operating temperature.

The main gearbox 2 also has a plurality of its own tertiary operating limits such as a limit torque and a limit operating temperature.

The avionics installation 5 has calculation means 6 and anticipation means 7.

FIG. 2 is a block diagram summarizing the method of the invention for regulating a power plant. This method of regulating a power plant comprises four main steps.

During a first step 51, a first setpoint NR* is determined for the frequency of rotation NR of the main rotor 31. This first setpoint NR* may be a fixed value as determined during development of the aircraft 30, or it may be a variable value that is then determined continuously while the aircraft 30 is in flight by the calculation means 6.

During a second step 52, the operation of each main engine 11, 12 is regulated on the first setpoint NR* for the frequency of rotation NR of the main rotor 31 by means of the first regulator device 15.

Thus, by means of the first regulator device 15, the first engine group 10 serves to control the frequency of rotation NR of the main rotor 31, this frequency of rotation NR being substantially equal to the first setpoint NR*.

The first regulator device 15 serves, by way of example, to regulate both main engines 11, 12 using a proportional integral regulation loop. Since these two main engines 11, 12 are identical, their operation is then symmetrical, each main engine 11, 12 contributing an equal share to driving the main rotor 31 via the main outlet shaft 3.

During a third step 53, a second setpoint $W_2$* is determined for the power to be delivered by the second engine group 20.

In a first implementation of the method, the second setpoint $W_2$* is determined in identical manner for the entire flight envelope of the aircraft 30. The second setpoint $W_2$* is determined by means of the calculation means 6 depending on the main operating limits of the main engines 11, 12 of the first engine group 10 so that the secondary engine 21 operates with the lowest second margin that is equal to the lowest first margin from among the first margins of the main engines 11, 12.

In a second implementation of the invention, the second setpoint $W_2$* is determined in different manner depending on the most critical operating limit of the power plant 1 from among the main operating limits of the main engines 11, 12 and the tertiary operating limits of the main gearbox 2.

Two scenarios are possible, shown in the graph in FIG. 3, depending on the flight envelope of the aircraft 30, and in particular depending on the atmospheric pressure Zp around the aircraft 30 associated with its altitude and the temperature T of the air outside the aircraft 30.

Thus, when the most critical operating limit of the power plant 1 is a main operating limit of the main engines 11, 12, corresponding to the zone A in FIG. 3, the second setpoint $W_2$* is determined, as for the first implementation of the invention, i.e. so that each secondary engine 21 operates with the lowest second margin that is equal to the lowest first margin of the first engine group 10.

However, when the most critical operating limit of the power plant 1 is a tertiary limit of the main gearbox 2, corresponding to the zone B in FIG. 3, the second setpoint $W_2$* is determined so that said second setpoint $W_2$* is equal to the limit power of the main gearbox 2 minus the sum of the maximum powers of each main engine 11, 12. This limit torque that the main gearbox is capable of providing is determined as a function of its limit torque or of its limit operating temperature and current operating conditions.

By way of example, and as shown in FIG. 3, the portion of the flight envelope in which the most critical operating limit of the power plant 1 is a tertiary limit of the main gearbox 2 occurs at an atmospheric pressure corresponding to an altitude lying in the range 500 feet (ft) to 10000 ft and a temperature of the air outside the aircraft 30 lying in the range −40 degrees Celsius (° C.) to 15° C.

However, these values vary greatly from one aircraft to another and they also depend on the power delivered by its main engines, as a function, for example, of their state of aging. Furthermore, for a given aircraft, the greater the power delivered by the main engines is, the greater the size of the zone B of FIG. 3 is.

During a fourth step 54, the operation of the secondary engine 21 is regulated on the second setpoint $W_2$* for power by the second regulator device 25. The second engine group 21 thus delivers second power $W_2$ that is substantially equal to the second setpoint $W_2$*.

The operation of the secondary engine 21 is thus optimized as a function of power requirements from the main engines 11, 12. The secondary engine 21 is in particular heavily loaded when the main engines 11, 12 are themselves heavily loaded. The second power $W_2$ of said secondary engine 21 thus makes it possible to reduce the load on said main engines 11, 12.

The method of regulating a power plant may also include three additional steps.

During a fifth step 55, a flight anticipation power Ws* is determined by the anticipation means 7. This flight anticipation power Ws* corresponds to power that is necessary for the flight of the aircraft 30 and that needs to be delivered jointly by the main engines 11 and 12 and the secondary engine 21.

During a sixth step 56, the calculation means 6 determine a third setpoint $W_1^*$ for the power that the first engine group 10 is to deliver, such that:

$$Ws^* = W_1^* + W_2^*$$

During a seventh step 57, the third setpoint $W_1^*$ for power is used so that the first engine group 10 and the second engine group 20 anticipate a power need of the aircraft 30 and jointly deliver the flight anticipation power Ws*.

The first engine group 10 and the second engine group 20 then jointly deliver an output power Ws that is equal to the sum of the second output power $W_2$ delivered by the second engine group 20 plus a first power $W_1$ delivered by the first engine group 10, such that:

$$Ws = W_1 + W_2$$

The first power $W_1$ is then substantially equal to the third setpoint $W_1^*$ and the output power Ws is substantially equal to the flight anticipation power Ws*.

Furthermore, in the event of failure of a main engine 11, 12, it is possible to regulate the operation of the secondary engine 21 on the second setpoint $W_2^*$ for power in a manner that is identical to the first implementation. Thus, the secondary engine 21 operates with the lowest second margin that is equal to the lowest first margin of the first engine group 10.

In the event of failure of a main engine 11, 12, it is also possible to regulate the operation of the secondary engine 21 on the second setpoint $W_2^*$ for power in a manner that is identical to the second implementation.

Nevertheless, in the event of a failure of a main engine 11, 12, the regulation of the secondary engine 21 may also be different so as to have a different distribution of power delivery by the power plant 1 between the main engine 11, 12 that has not failed and the secondary engine 21.

For example, it is possible to use the secondary engine 21 delivering its available maximum power. The second engine group 20 then delivers a second maximum power $W_2$ in order to limit the first power $W_1$ delivered by the first engine group 10. It is thus possible to reduce or even avoid use of the OEI contingency modes of each of the main engines 11 and 12 and the associated contingency mechanical powers.

It is also possible to regulate the operation of the secondary engine 21 on the first setpoint NR* for the frequency of rotation NR of the main rotor 31, in order to guarantee that this first setpoint NR* is complied with. This regulation may be performed in proportional mode or in proportional integral mode.

Naturally, the present invention may be subjected to numerous variations as to its implementation. Although several implementations are described, it should readily be understood that it is not conceivable to identify exhaustively all possible implementations. It is naturally possible to envisage replacing any of the means described by equivalent means without going beyond the ambit of the present invention.

What is claimed is:

1. A method of regulating a power plant of a rotary wing aircraft, the power plant comprising a first engine group, a second engine group, and a main power transmission gearbox, the two engine groups mechanically driving the main gearbox in order to rotate a main outlet shaft of the main gearbox, the main outlet shaft being constrained to rotate with a main rotor of the aircraft having a frequency of rotation NR, the first engine group having at least two main engines, the second engine group having at least one secondary engine, each main engine having a plurality of main operating limits and operating with first margins respectively relative to each of the main operating limits, each secondary engine having a plurality of secondary operating limits and operating with second margins respectively relative to each of the secondary operating limits, the method comprising the following steps:

determining a first setpoint NR* for the frequency of rotation NR of the main rotor;

regulating the operation of each main engine on the first setpoint NR* for the frequency of rotation NR;

determining a second setpoint $W_2^*$ for power to be delivered by the second engine group, so that each secondary engine operates with the lowest second margin that is equal to the lowest first margin of the first engine group; and regulating the operation of each secondary engine on the second setpoint $W_2^*$ for power.

2. The method of regulating a power plant according to claim 1, comprising the following steps:

determining a flight anticipation power Ws* needed for the flight of the aircraft and to be delivered jointly by the first engine group and the second engine group;

determining a third setpoint Wi* for power to be delivered by the first engine group, such that:

$$Ws^* = W_1^* + W_2^*$$

using the third setpoint $W_1^*$ for power so that the first engine groups and the second engine group anticipate a power need of the aircraft and act jointly to deliver the flight anticipation power Ws*.

3. The method of regulating a power plant according to claim 1, wherein, the main gearbox having a plurality of tertiary operating limits having a limit power that it can transmit to the outlet shaft, each main engine being capable of delivering a maximum power, when the most critical operating limit of the power plant is a tertiary limit of the main gearbox, the second setpoint $W_2^*$ is determined so that it is equal to the limit power of the main gearbox minus the sum of the maximum powers of each main engine.

4. The method of regulating a power plant according to claim 3, wherein the maximum power for each main engine is determined depending on the stage of flight of the aircraft.

5. The method of regulating a power plant according to claim 4, wherein a selection algorithm is used for determining the stage of flight of the aircraft using the values for a horizontal speed Vh and a vertical speed Vz of the aircraft.

6. The method of regulating a power plant according to claim 1, wherein in the event of a failure of at least one main engine, the operation of each secondary engine is regulated on the first setpoint NR* for the frequency of rotation NR of the main rotor.

7. The method of regulating a power plant according to claim 1, wherein in the event of a failure of at least one main engine, the operation of each secondary engine is regulated on the second setpoint $W_2^*$ for power.

8. The method of regulating a power plant according to claim 1, wherein in the event of a failure of at least one main engine, the operation of each secondary engine is regulated so that it delivers its maximum power.

9. The method of regulating a power plant according to claim 1, wherein the first engine group comprises two identical main engines, and the second engine group comprises one secondary engine.

10. A power plant for an aircraft, the power plant comprising a first engine group, a second engine group, and a main power transmission gearbox, the two engine groups mechanically driving the main gearbox in order to rotate at least one main outlet shaft of the main gearbox, the main outlet shaft being constrained to rotate with a main rotor of the aircraft having a frequency of rotation NR, the first engine group having at least two main engines and a first regulator device, the first regulator device being configured to regulate the operation of each main engine on a first setpoint NR* for the frequency of rotation NR of the main rotor, the second engine group comprising at least one secondary engine and a second regulator device, the second regulator device being configured to regulate the operation of each secondary engine on a second setpoint $W_2^*$ for power from the second engine group, each main engine having a plurality of main operating limits and operating with first margins relative to each of the main operating limits, each secondary engine having a plurality of secondary operating limits and operating with second margins relative to the secondary operating limits, the power plant including calculation means configured to determine the second setpoint $W_2^*$ so that each secondary engine operates with the lowest second margin that is equal to the lowest first margin of the first engine group.

11. The power plant according to claim 10, wherein the calculation means comprise anticipation means configured to determine a flight anticipation power Ws* necessary for the flight of the aircraft and that needs to be delivered jointly by the first engine group and the second engine group, a third setpoint $W_1^*$ to be delivered by the first engine group and defined such that:

$$Ws^* = W_1^* + W_2^*$$

being used so that the first engine group (10) and the second engine group (20) anticipate a power need of the aircraft (30) and deliver jointly the flight anticipation power Ws*.

12. The power plant according to claim 10, wherein the main gearbox having a plurality of tertiary operating limits having a limit power, each main engine being capable of delivering a maximum power, when the most critical operating limit of the power plant is a limit of the main gearbox, the calculation means determine the second setpoint $W_2^*$ to be equal to the limit power of the main gearbox minus the sum of the maximum powers of each main engine.

13. The power plant according to claim 12, wherein the maximum power for each main engine is defined depending on the stage of flight of the aircraft.

14. The power plant according to claim 10, wherein the first engine group comprises two identical main engines, and the second engine group comprises one secondary engine.

15. The power plant according to claim 10, wherein in the event of a failure of at least one main engine, the second regulation device is configured to regulate the operation of each secondary engine on the first setpoint NR* for the frequency of rotation NR of the main rotor.

16. The rotary wing aircraft having at least a main rotor, a power plant, and an avionics installation, the power plant driving the main rotor in rotation, and the aircraft including the power plant that is a power plant according to claim 10.

\* \* \* \* \*